(12) United States Patent
Rawlins

(10) Patent No.: US 11,201,813 B2
(45) Date of Patent: Dec. 14, 2021

(54) SYSTEM AND METHOD FOR DISTRIBUTION OF ROUTES IN A TELECOMMUNICATIONS NETWORK

(71) Applicant: Level 3 Communications, LLC, Broomfield, CO (US)

(72) Inventor: Logan Rawlins, Gilbert, AZ (US)

(73) Assignee: Level 3 Communications, LLC

( * ) Notice: Subject to any disclaimer, the term of this patent is extended or adjusted under 35 U.S.C. 154(b) by 87 days.

(21) Appl. No.: 16/776,024

(22) Filed: Jan. 29, 2020

(65) Prior Publication Data

US 2020/0358691 A1    Nov. 12, 2020

Related U.S. Application Data

(60) Provisional application No. 62/846,364, filed on May 10, 2019.

(51) Int. Cl.
| | | |
|---|---|---|
| *H04L 12/715* | (2013.01) | |
| *H04L 12/751* | (2013.01) | |
| *H04L 12/46* | (2006.01) | |
| *H04L 12/703* | (2013.01) | |
| *H04L 29/08* | (2006.01) | |
| *H04L 12/723* | (2013.01) | |
| *H04L 12/755* | (2013.01) | |
| *H04L 12/707* | (2013.01) | |

(Continued)

(52) U.S. Cl.
CPC .......... *H04L 45/04* (2013.01); *H04L 12/4641* (2013.01); *H04L 45/02* (2013.01); *H04L 45/021* (2013.01); *H04L 45/22* (2013.01); *H04L 45/28* (2013.01); *H04L 45/44* (2013.01); *H04L 45/50* (2013.01); *H04L 45/745* (2013.01); *H04L 69/329* (2013.01)

(58) Field of Classification Search
CPC ... H04L 12/4641; H04L 45/02; H04L 45/021; H04L 45/22; H04L 45/28; H04L 45/44; H04L 45/50; H04L 45/745; H04L 69/329; H04L 25/04
See application file for complete search history.

(56) References Cited

U.S. PATENT DOCUMENTS 8,064,443 B2 * 11/2011 Scudder .................. H04L 45/04
                                                      370/389
8,737,406 B1 *  5/2014 Cavanaugh ............. H04L 45/02
                                                      370/395.31

(Continued)

*Primary Examiner* — Donald L Mills

(57) ABSTRACT

A traffic controller device for distributing or otherwise controlling the distribution of routing information may be included in a telecommunications network. The traffic controller may receive routing tables from a plurality of network devices, such as one or more provider edge devices of the network. The traffic controller, upon receiving the routing information from the provider edge devices, may generate a routing table associated with each device providing the routing information. The traffic controller may also provide updates to one or more of the networking devices associated with the controller. The traffic controller may alter or update, at the traffic controller, the routing table associated with the target provider edge device based on the network policy. The routing information in the routing table for that device and maintained by the traffic controller may be updated with a new route or new local preferred parameter value.

14 Claims, 6 Drawing Sheets

(51) Int. Cl.
*H04L 12/721* (2013.01)
*H04L 12/741* (2013.01)

(56) References Cited

U.S. PATENT DOCUMENTS

| | | | |
|---|---|---|---|
| 2008/0062891 A1* | 3/2008 | Van der Merwe | H04L 45/04 370/254 |
| 2014/0198794 A1* | 7/2014 | Mehta | H04L 45/04 370/392 |
| 2016/0226760 A1* | 8/2016 | Liljenstolpe | H04L 45/74 |
| 2017/0054628 A1* | 2/2017 | Tomotaki | H04L 12/4633 |

* cited by examiner

US 11,201,813 B2

SYSTEM AND METHOD FOR DISTRIBUTION OF ROUTES IN A TELECOMMUNICATIONS NETWORK

CROSS-REFERENCE TO RELATED APPLICATION

This application is related to and claims priority under 35 U.S.C. § 119(e) from U.S. Patent Application No. 62/846,364, filed May 10, 2019 entitled "SYSTEM AND METHOD FOR DISTRIBUTION OF ROUTES IN A TELECOMMUNICATIONS NETWORK," the entire contents of which is incorporated herein by reference for all purposes.

TECHNICAL FIELD

Embodiments of the present invention generally relate to systems and methods for implementing a telecommunications network, and more specifically for distributing routes to routing devices within a network based on one or more network policies.

BACKGROUND

Many telecommunications networks include a process of announcing routing information to devices within and outside the network, and then re-broadcasting or announcing the routing information to other devices. Routing information generally provides information as to how to reach a destination device or destination address, whether internal or external to the network, through a traversal of networking devices. Through this route announcement process, devices within the network receive information of the interconnectivity between devices of the network and devices of other connected network through which communication packets may be transmitted to a destination. The devices of the network may also store a routing table based on the received interconnectivity information and generate or alter the routing table as new or altered routes are announced. However, the route announcement process may cause undesirable issues for many networks, especially for packets intended for border networks or other customers that connect to a backbone network in multiple locations and/or connections. For example, many networks utilize route reflector devices to re-broadcasting or share routes received from external networks or customers. For example, a route reflector may receive an announced route to transmit a communication to an external network and broadcast that received route to devices within the same network as the route reflector. These network devices may be referred to as clients of the route reflector. Instances in which the route reflector receives multiple routes to the same destination, many route reflectors are often configured to only broadcast a preferred or "best" route to other internal network devices. For example, a border network that connects to the route reflector network via multiple egress devices may provide multiple egress routes for a network device to transmit communications to the announcing network.

Although the best route for a particular destination address or device may provide some benefits to the originating network, the best route may also force all traffic from the network to the border network onto the one route, potentially overloading that route or a device on the route when other open routes may be available for reaching the destination or border network. In another example, alternate routes may be selected by the network in response to a failure at a device or network along the route. The alternate route may be provided to a route reflector device within a network that distributes the alternate route to multiple other devices that are clients to the route reflector. However, because the distribution of the alternate route is provided to the multiple clients at once, control over routes to a specific routing device may not be available. As such, the route reflector method of announcing routes within a network may not provide the most effective route for all communications to reach a destination network or device.

It is with these observations in mind, among others, that aspects of the present disclosure were conceived.

SUMMARY

One aspect of the present disclosure relates to a method for operating a telecommunications network. The method may include receiving, at a first network device, a plurality of routing information from a plurality of edge devices of a telecommunications network, each of the plurality of routing information comprising a local preferred route for a corresponding edge device and generating a plurality of virtual routing tables, each of the plurality of virtual routing tables associated with a corresponding edge device of the plurality of edge devices and comprising the local preferred route for the corresponding edge device. The method may also include the operations of updating, by the first network device, a first routing table of the plurality of virtual routing tables with an updated local preferred route different than an initial local preferred route of the first routing table and transmitting, via a border gateway protocol session and to the corresponding edge device associated with the first routing table, the updated local first routing table.

Another aspect of the present disclosure relates to an apparatus comprising a processing device, a communication port receiving a plurality of routing information from a plurality of edge devices of a telecommunications network, each of the plurality of routing information comprising a local preferred route for a corresponding edge device, and a non-transitory computer-readable medium encoded with instructions. When such instructions are executed by the processing device, the processing device may perform the operations of generating a plurality of virtual routing tables, each of the plurality of virtual routing tables associated with a corresponding edge device of the plurality of edge devices and comprising the local preferred route for the corresponding edge device, updating a first routing table of the plurality of virtual routing tables with an updated local preferred route different than an initial local preferred route of the first routing table, and transmitting, via a border gateway protocol session and to the corresponding edge device associated with the first routing table, the updated local first routing table.

Yet another aspect of the present disclosure relates to a telecommunications network comprising a plurality of network devices and a traffic controller. The traffic controller may include a processing device, a communication port receiving a plurality of routing information from the plurality of network devices, each of the plurality of routing information comprising a local preferred route for a corresponding network device, and a non-transitory computer-readable medium encoded with instructions. When such instructions are executed by the processing device, the processing device may perform the operations of generating a plurality of virtual routing tables, each of the plurality of virtual routing tables associated with a corresponding network device of the plurality of network devices and comprising the local preferred route for the corresponding network device, updating a first routing table of the plurality of virtual routing tables with an updated local preferred route different than an initial local preferred route of the first routing table, and transmitting, via a border gateway protocol session and to the corresponding network device associated with the first routing table, the updated local first routing table.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Figure 1:
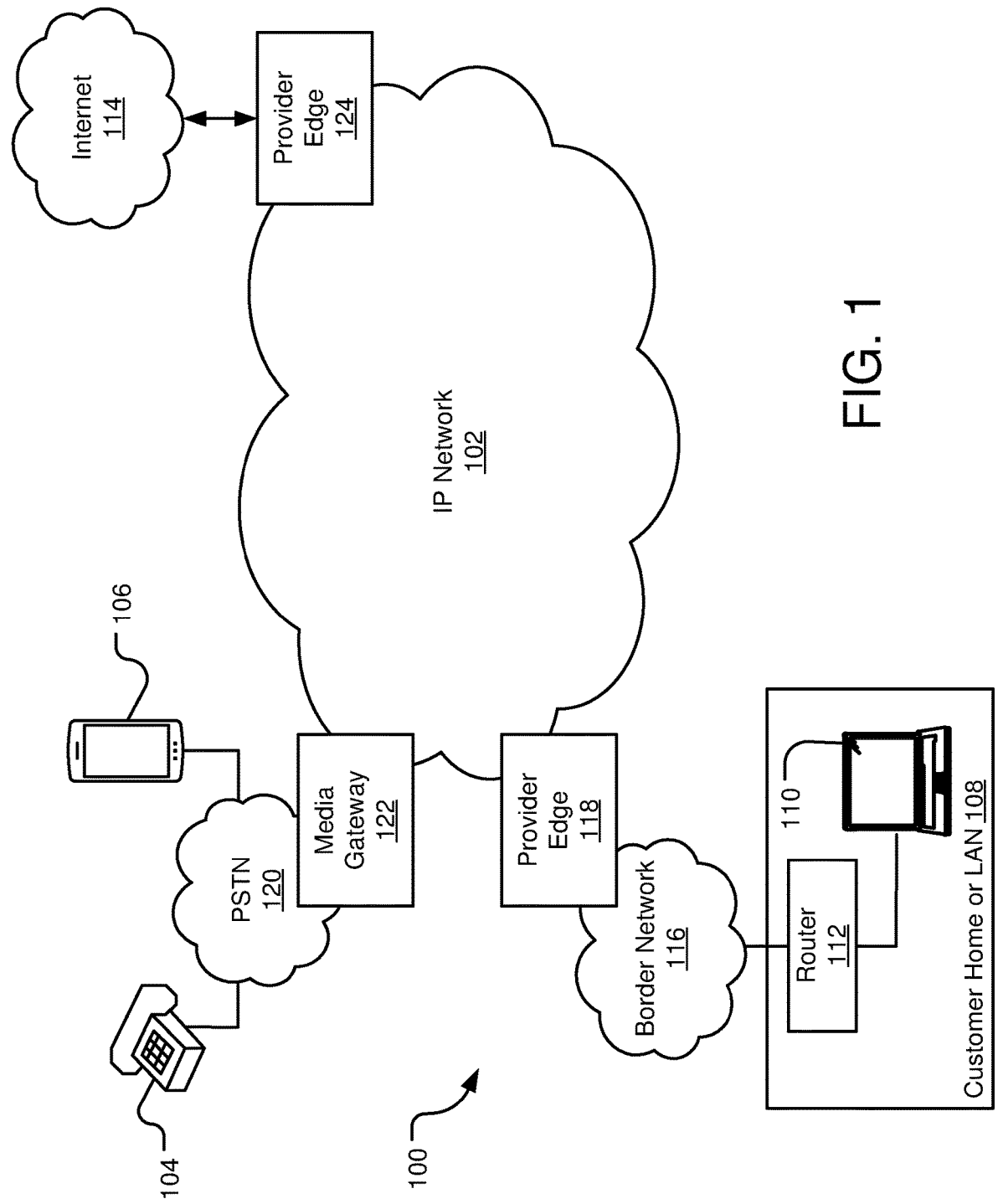
FIG. 1 schematic diagram illustrating an exemplary Internet Protocol (IP) operating environment in accordance with one embodiment.

Aspects of the present disclosure involve systems, methods, and the like, for distributing or otherwise controlling the distribution of routing information in a telecommunications network. In one implementation, a traffic controller device may be included in a telecommunications network. The traffic controller may receive routing tables or other routing information from a plurality of network devices, such as one or more provider edge devices of the network. The routing information of each network device may be received from one or more route reflector devices of the network such that a local preferred route may be associated with a particular metro or locality of the network. The traffic controller, upon receiving the routing information from the provider edge devices, may generate a routing table associated with each device providing the routing information. For example, the traffic controller may generate and store a first routing table for a first provider edge device based on the routing information provided to the traffic controller from the first provider edge device. The traffic controller may generate and store a second routing table for a second provider edge device based on the routing information provided to the traffic controller from the second provider edge device. In some instances, the routing information from the first provider edge and the second provider edge may be similar as each provider edge may receive the same or similar routing information from a route reflector. In some instances, the routes seen from either provider edge may be different as the routes announce the best external BGP route and best BGP routes unique to that provider edge.

The traffic controller may also provide updates to one or more of the networking devices associated with the controller. For example, a network policy may determine an update to a local preferred route at one of the provider edge devices associated with the traffic controller. The traffic controller may alter or update, at the traffic controller, the routing table associated with the target provider edge device based on the network policy. To update the local preferred route at a particular device, the routing information in the routing table for that device and maintained by the traffic controller may be updated with a new route or new local preferred parameter value. In some instances, the updated routing information may be obtained from another routing table maintained by the traffic controller for a separate provider edge device. The updated routing table may be provided to the corresponding provider edge device through an internal border gateway protocol (iBGP) session between the target provider edge device and the traffic controller. The target provider edge device may be a BGP client of the traffic controller device such that routing information at the traffic controller may be provided to the edge device. By updating the routing table at the traffic controller, targeted route updates may be provided to singular devices within the network such that different routing information may be provided to devices that share the same route reflector device. In this manner, routing information and control over routes may be provided within the network and within metros or other localities of the network.

FIG. 1 illustrates an exemplary operating environment 100 for distributing routes to routing devices within a network based on one or more network policies. In general, the environment 100 provides for establishing communication sessions between network users and for providing one or more network services to network users. For example, users may utilize the network 102 to communicate via the network using communication devices, such as telephone devices 104 and/or mobile communication devices 106. In another example, content from a content delivery network (CDN) may be provided to and/or from one or more customers of the network 102 through the operating environment 100 discussed herein. In still another example, the network environment 100 may facilitate communications between networks managed or administered by separate entities, such as communications between IP network 102 and border network 116. With specific reference to FIG. 1, the environment 100 includes an IP network 102, which may be provided by a wholesale network service provider. However, while the environment 100 of FIG. 1 shows a configuration using the IP network 102, it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. The IP network 102 may also include a traffic controller device, discussed in more detail below with reference to FIG. 3 to provide routing information to one or more other components of the network 102. Communications between the IP network 102 and other entities or networks, such as the one or more customer home or business local area networks (LANs) 108, may also be managed through network environment 100.

Customer network 108 can include communication devices such as, but not limited to, a personal computer or a telephone 110 connected to a router/firewall 112. Although shown in FIG. 1 as computer 110, the communication devices may include any type of communication device that receives a multimedia signal, such as an audio, video or web-based signal, and presents that signal for use by a user of the communication device. The communication and networking components of the customer network 108 enable a user at the customer network to communicate via the IP network 102 to other communication devices, such as another customer network and/or the Internet 114. Components of the customer network 108 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 108 typically connects to the IP network 102 via a border network 116, such as one provided by an Internet Service Provider (ISP). The border network 116 is typically provided and maintained by a business or organization such as a local telephone company or cable company. The border network 116, also referred to as a peer network, may provide network/communication-related services to their customers. Other communication devices, such as telephonic device 104 and/or mobile device 106, may access and/or be accessed by, the IP network 102 via a public switched telephone network (PSTN) 120 operated by a local exchange carrier (LEC). Communication via any of the networks can be wired, wireless, or any combination thereof. The telephonic device 104, mobile device 106, and/or computing device 110 may further utilize the IP network 102 to communicate with or otherwise access the Internet 114 to provide and obtain data.

Networks, such as the Internet 114, border network 116, and/or PSTN 120, may connect to IP network 102 through one or more interface devices. Interface devices may include, but are not limited to, provider edge devices 118 and 124 and/or provider media gateway device 122. For ease of instruction, only three external networks 114, 116, and 120 are shown communicating with the IP network 102; however, numerous such networks, and other devices, may be connected with the network 102, which is equipped to handle enormous numbers of simultaneous calls and/or other IP-based communications.

Figure 2:
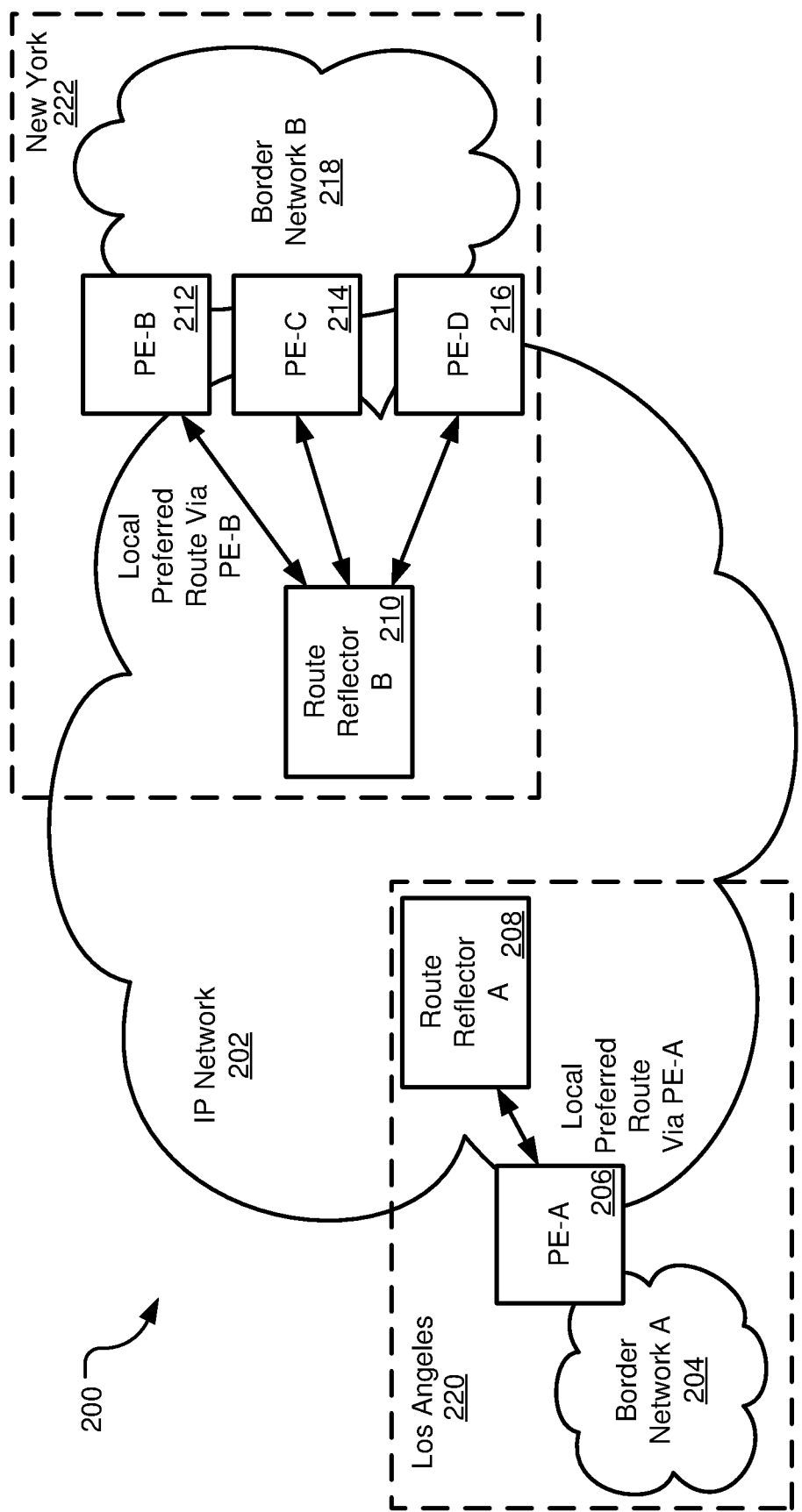
FIG. 2 is a schematic diagram illustrating a network environment to distribute routes of a telecommunications network utilizing one or more route reflector devices.

The telecommunications network 102 may provide an interface to a customer or border network 116, 120 for the customer or border network to connect to the network 102 through a provider edge 118, 124, media gateway 122, or some other type of network edge device. In some instances, a border network 116 may connect to the telecommunications network 102 through more than one edge device in multiple locations. For example, FIG. 2 is a schematic diagram illustrating a network environment 200 to distribute routes of a telecommunications network utilizing one or more route reflector devices 208, 210. The telecommunications network 202 of FIG. 2 may be similar to that of FIG. 1 such that the networks may include the same or similar components. Further, border network A 204 and border network B 218 connected to the telecommunications network 202 may utilize the network to send and receive packets of information to/from other customers to the network.

As shown in FIG. 2, a border network (border network A 204) connects to the backbone network 202 through a provider edge device (provider edge A 206). Border network B 218, however, connects to the backbone network 202 through multiple provider edge devices 212-216. In particular, border network B 218 connects to IP network 202 through provider edge B 212, provide edge C 214, and provider edge D 216. In one example, border network A 204 and border network B 218 may be for the same customer to the network 202 such that the border networks may be managed or controlled by the entity and/or share the same autonomous system (AS) number identifying the border network. As such, the AS border network connects to the telecommunications network 202 at multiple ingress/egress points, and in some instances, in various geographic locations. For example, provider edge A 206 may be located in Los Angeles, Calif. such that the border network 204 connects to the IP network 202 in Los Angeles via provider edge A 206. Border network B 218, although of the same AS network, may connect to IP network 202 through provider edge B 212, provider edge C 214, and provider edge D 216, which may all be located in New York City, N.Y. In other examples, border network A 204 and border network B 218 may be separate border networks with different AS identifiers. For the present disclosure, the border networks 204, 218 are considered to include the same AS identifier such that communications intended for a particular client identified by an AS number may be provided to the client at border network A 204 or border network B 218 for routing to the indicated destination device.

The connections between the border network 204, 218 and the backbone network 202 provide multiple routes between the networks along which communications or packets may be transmitted. The border network 204, 218 may connect to the backbone network 202 through any number of edge devices in any geographic locations (also known as "gateways") in which the telecommunications network is present. A gateway may include connection to the network 202 through a single edge device (such as provider edge A 206) or may include connections to the network via multiple edge devices (such as provide edge B 212, provider edge C 214, and/or provider edge D 216). Although not illustrated for simplicity, each provider edge device of the telecommunications network 202 may communicate with a similar provider edge device of a corresponding border network 204, 218 to transmit and receive communication packets between the networks. In this manner, a border network 204, 218 may connect to the telecommunications network 202 through several connections in several locations.

In one particular configuration, the network 202 may include one or more route reflector devices or servers, such as route reflector A 208 and/or route reflector B 210. In general, a route reflector 208, 210 is a server that receives an announced route from a telecommunications device and broadcasts the received route to one or more client devices within the same network 202. For example, route reflector B 210 may receive announced routes from provider edge B 212 and/or provider edge C 214 and re-broadcast the received routes to other provider edges (such as provider edge D 216), servers, media gateways, etc. of the network 202. The use of the route reflectors 208, 210 in the network 202 removes the need for each device of the network to communicate its announced route to each of the other devices in the network. Rather, one or more devices within the network 102 may be a client of the route reflector 210 and receive routes associated with the network 102 from the route reflector instead of from each other network device.

In some instances, the route that is received and broadcast by the route reflector 208 is a route announced by the provider edge device of the network 202 via a border gateway protocol (BGP) announcement. In general, BGP information (or BGP session, BGP feed or BGP data) is a table of Internet Protocol (IP) prefixes which designate network connectivity information, such as routes or transmission paths (including next-hop information), network policies and/or rule-sets for transmission along the path, among other information. The BGP feed may also include External Border Gateway Protocol (eBGP) for network connectivity information between different AS networks and/or Interior Border Gateway Protocol (iBGP to IGP) information for network routes within an AS or network. Thus, eBGP information mainly describes routes used by the network 202 to connect to external networks or customers (such as border networks 204, 218) while IGP information describes routes within the network 202 to connect one provider edge (such as provider edge A 206) to another provider edge (such as provider edge B 212) through a telecommunications network.

One or more of the components of the network 202 may announce, through a BGP session, those routes that may be serviced by that component. For example, PE-B 212 may provide a BGP announcement that indicates which networks (such as border network 218) that may be accessed through PE-B. Thus, the BGP announcement for PE-B 212 may include a path and next-hop information that designates a route along which packets may be transmitted or received from the connected networks (such as border network 218). The next-hop information generally identifies a particular device of the network 202 through which a destination device or address is available. For example, a particular Internet Protocol (IP) address associated with a customer of the network 202 or border network 218 may be announced from a device of the border network 218 to PE-B 212. PE-B 212 may receive the IP address and announce the address to route reflector B 210 to indicate that communication packets intended for that IP address or destination device of the border network 218 may be processed through PE-B 212 to reach the intended destination. The BGP announcements from the provider edges to the route reflector 210 may be re-broadcast to other components of the network 202 such that each component of the network 202 may become aware of the egress ports available for customers or networks connected to the network 202 and how to route packets intended for those connected networks.

As described above, a border network may connect to the IP network 202 through multiple connection points to optimize traffic, scale the network, and/or provide geographic separation. For example, border network A 204 and border network B 218 of FIG. 2 may be managed by the same entity and have the same AS. However, the AS may connect to the IP network 202 in Los Angeles 220 through provider edge A 206 and in New York 222 through provider edge B 212, provider edge C 214, and provider edge D 216. In general, communications intended for the AS border network 204, 218 are provided to the border network via the nearest egress point in the network 202. For example, communications intended for the AS border network 204, 218 that is received at the IP network 202 in or near New York 222 would egress the network via on the provider edges 212-216 in the New York area. Similarly, communications intended for the AS border network 204, 218 that is received at the IP network 202 in or near Los Angeles 220 would egress the network via on the provider edge A 206 in the Los Angeles area.

In some cases, the backbone network 202 may designate a "preferred" or "best" route configured to route communications intended for the border network 204, 218 via the nearest egress point based on the geographic location of the received communication. The preferred route may be determined by any device of the network 202, such as the route reflector 208, 210 or the provider edge 206, 212-216. For example, once BGP information is received, the device may execute a selection process to determine which route to utilize to transmit a received communication packet to a destination device or address. In one embodiment, the route selection process executed by the device selects the best path for reaching a destination based on one or more of shortest distance, transmission cost, closest egress, and the like. The selected route may be based on the geographic location or device in which the communication is received. For example, a communication received at the backbone network 102 at a location in or near Los Angeles 220 and intended for AS border network 204,218 may be routed via PE-A 206 while a communication received at the backbone network at a location in or near New York 222 and intended for AS border network 204,218 may be routed via PE-B 212, PE-C 214, or PE-D 216. In general, any route preference algorithm may be executed by the network device when determining the "best" route to egress the backbone network 102.

For networks 202 that include a route reflector 208, 210 device, the route reflector may determine the "best" path for a route and provide to the selected route to the client devices of the reflector. For example, a border network 204, 218 may have multiple connections to the network 202. In the example illustrated in FIG. 2, route reflector B 210 receives BGP routing information for border network 218 from provider edge B 212 and provider edge C 214 as that particular border network is connected to the illustrated edge devices. Similarly, route reflector A 208 receives BGP routing information for border network 204 from provider edge A 206. Route reflector B 210 may select a best route for providing communications to border network B 218. For example, route reflector B 210 may select provider edge B 212 as the best egress route to reach border network B 218. Thus, the local preferred route in New York 222 for border network B 218 is via provider edge B 212 and communications intended for border network B 218 received in New York 222 may be routed to PE-B 212. This preferred route may be transmitted to other devices in the network 202, including provider edge C 214 and provider edge D 216 for inclusion in their respective routing tables. The other devices within the network 202 may store the preferred route as the best egress route for use in routing communications to border network B 218 in New York 222. In a similar manner, route reflector A 208 may select a best route for providing communications to border network A 204 in Los Angeles 220 (even though border network A 204 and border network B 218 are the same AS network) such that the local preferred route in Los Angeles for border network A 204 is via provider edge A 206. Thus, devices in the network 202 within a metro or locality may receive a single routing path through one of the possible multiple egress ports to the connected border network, even though multiple egress paths or routes are available.

The selection of a local preferred best path may be based on any performance metric, topology, or business consideration of the network 202 and/or border network 218. For example, the border network 218 may provide a preferred ingress route into the network that the route reflector 210 may utilize as the local preferred best route. In another example, the backbone network 202 may determine a current load or the presence of an alert or failure along a route to determine the local preferred route to a border network 218. Once a preferred route is determined, the route reflector 210 may broadcast the preferred route with one or more parameters that identifies the route as the preferred route. For example, the route reflector 210 may set a local preference parameter of the BGP information that the corresponding provider edges 212-216 may utilize to determine the next-hop when routing a received communication. Network devices, when selecting a route from a routing table for transmitting a received communication, may execute a route decision tree that includes the best path route received from the route reflector. For example, the decision tree may include an operation to evaluate a local preferred route as indicated by the local preferred route parameter, such as a local preferred route parameter may be set at a value of "86", and select that route when available. Routes in the routing table with a higher local preferred route parameter value may be selected before routes with a lower local preferred route parameter value. Continuing the example, routes to border network B 218 with a local preferred route parameter less than 86 may not be selected by a routing device when routing to border network B 218, although such routes may be included in the routing table for that device. In this manner, the routing table may indicate local preferred routes for particular destinations.

The use of route reflectors 208, 210 within the network 202 may reduce the number of routes stored by each device of the network 202 by refining and reducing the number of routes available for routing a received communication via the best route scheme. However, control over individual routes through the network may be lost as the number of available routes is reduced. For example, an administrator for network 202 may configure route reflector B 210 to select a different local preferred route for border network B 218, such as through provider edge C 214 rather than provider edge B 212. This new preferred route may be provided, via BGP announcements, to each device that is a client of the route reflector 210 such that the best route is changed for each device within the metro or network area. In other words, each provider edge (provider edges 212-216) in the New York locality 222 may receive the new preferred route from the route reflector 210. However, in some instances, it may be advantageous to control routes at particular devices of the network 202, such as a particular provider edge of the network. For example, a customer to the backbone network 202 may request, based on one or more business considerations, communications received in New York 222 to egress the network 202 in Los Angeles 220 through provider edge A 206. As the provider edges in New York include the local preferred route to border network B 218 via provider edge B 212, the network administrator may not be able fulfill the customer request. Instead, communications received at network 102 in New York 222 may be routed via PE-B 212 as the selected "best" route, despite the customer request. Alternatively, the preferred route may be configured by the administrator, but the new preferred route via provider edge A 206 in Los Angeles 220 may be provided to each provider edge 212-216 in New York 222 by route reflector B 210, as well, such that each provider edge, regardless of the metro in which the provider edge resides, may begin transmitting communications through provider edge A 206, providing additional strain on the network 102.

Figure 3:
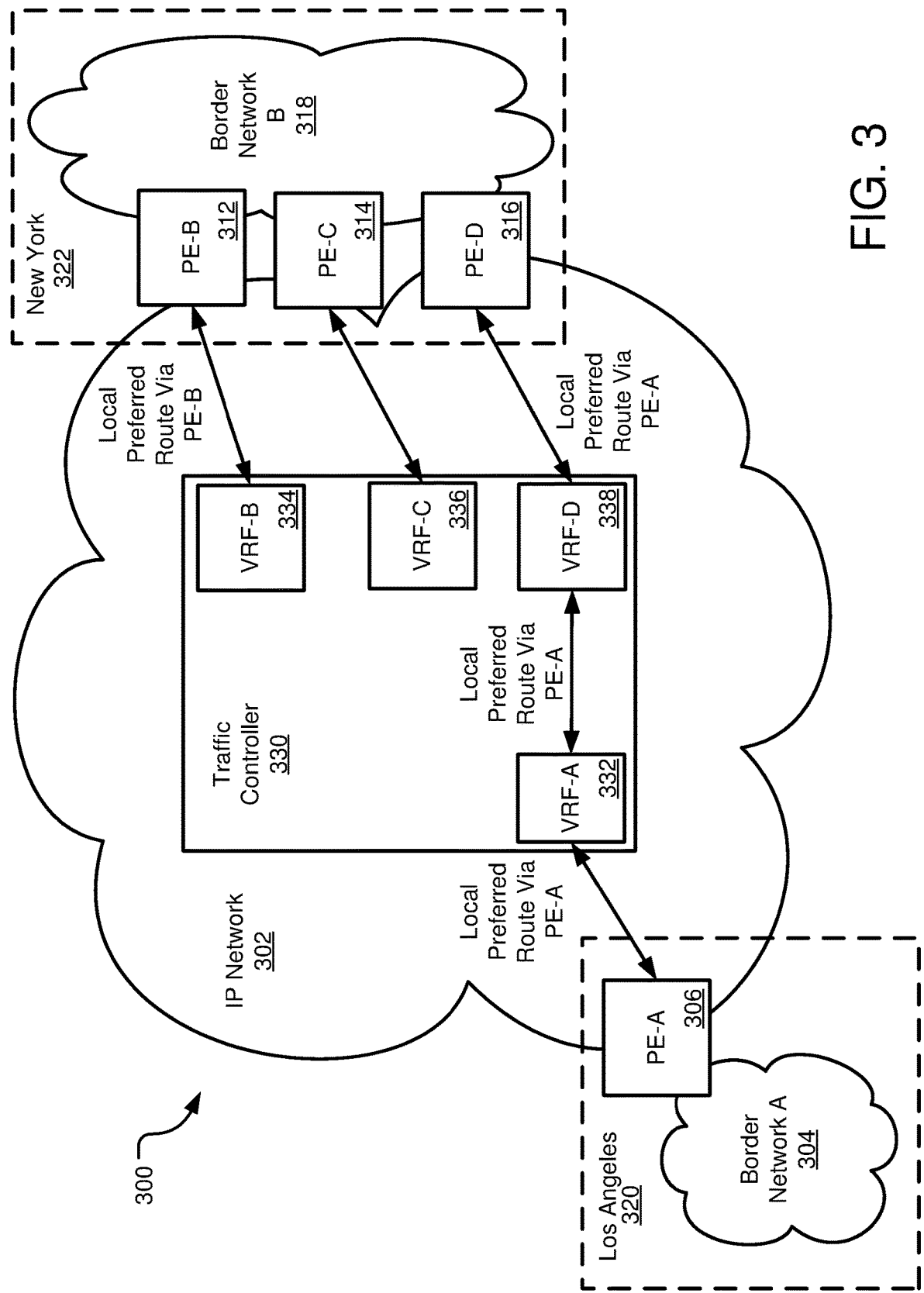
FIG. 3 is a schematic diagram illustrating a network environment to distribute routes of a telecommunications network utilizing a traffic or route controller device.

To provide more specific route control over individual devices within a network 202 that utilizes route reflectors 208, 210, a traffic controller device may be included in the network. FIG. 3 is a schematic diagram illustrating a network environment 300 to distribute routes of a telecommunications network utilizing a traffic or route controller device 330. Many of the components of the network environment 300 are similar to those discussed above. For example, border network A 304 may connect to IP network 302 via provider edge A 306 in the Los Angeles area 320. Border network B 318 may connect to network 302 via provider edge 312, provider edge C 314, and/or provider edge D 316 in the New York area 322. Further, although not illustrated in FIG. 3, the network 302 may include route reflector devices as discussed above to select and provide best or preferred routes to the provider edges of the network 302.

The network 302 of FIG. 3 may include a traffic controller device 330 to distribute routes to one or more other devices of the network 302. The traffic controller 330 may be embodied on a single device or on multiple devices within the network 302. For example, the traffic controller 330 may be an application server or other routing device of the network 302 configured to operate as described herein. In general, the traffic controller 330 may receive routing information from one or more other devices within the network 302, store the routing information in a separate routing table for each reporting device, and provide particular routing information to one or more of the reporting devices. As explained in more detail below, the traffic controller 302 may thus configure one or more devices, such as the provider edges 306, 312-316 of the network 302 with particular routes that may override a preferred route received through a BGP session or from a route reflector device.

As discussed above, provider edges 306, 312-316 of the network 302 may receive BGP or other routing information from a route reflector or from other routing devices of the network. Each provider edge 306, 312-316 may store the received routing information in a routing table for use in routing received communications. In addition, each provider edge device 306, 312-316 may be configured to provide the corresponding stored routing tables to the traffic controller 330 of the network 302. The traffic controller 330 may, in turn, generate a Virtual Routing and Forwarding (VRF) table to store each corresponding received routing table. For example, traffic controller 330 may store the routing table for provider edge A 306 in a VRF table A 332, the routing table for provider edge B 312 in a VRF table B 334, the routing table for provider edge C 314 in a VRF table C 338, and the routing table for provider edge D 316 in a VRF table D 338. Other provider edges and/or other devices of the network 302 may also provide routing tables to be stored in a corresponding VRF table by the traffic controller 330. The VRF tables 332-338 of the traffic controller 330 corresponding to the provider edges 306, 312-316 may be, in some instances, logically separated at the traffic controller such that the routing tables are not combined or reduced. Further, the traffic controller 330 may not determine or select a best route or path for a particular device as other devices. Rather, the traffic controller 330 may store a copy of the routing table maintained for each device that is a client of the traffic controller without altering the routing information included in each received routing table.

In embodiments of the network 302 that include route reflectors, the routing tables received from the provider edges 306, 312-316 may include the best routes or local preferred routes as determined by the route reflectors, as discussed above. For example, each provider edge 312-316 in the New York area 322 may include a preferred route via provider edge B 312 to border network B 318. This local preferred route may be provided to the provider edges 312-316 from a route reflector, as discussed above. Similarly, the routing table for provider edge A 306 may include a local preferred route via provider edge A 306 in Los Angeles 320 to reach border network A 304. The local preferred route for each provider edge 306, 312-316 may be stored in the corresponding VRF 332-338 maintained by the traffic controller 330.

The traffic controller 330 may provide for alteration of one or more routing tables maintained at the network devices (PE-A through PE-D) of the network 302. For example, the traffic controller 330 of the network 302 may alter one or more of the stored VRF tables 332-338 to override a preferred route or otherwise configure a routing table for a particular device within the network 302. In particular, an administrator of border network B 318 may request that communications received at provider edge D 316 be egressed via provider edge A 306 in Los Angeles 320 instead of a selected best route via provider edge B 312 or provider edge C 314. In response, a network administrator of network 302 may access the VRF table associated with one or more of the network devices and alter the local preferred route, such as altering a local preferred route at provider edge D 316 from provider edge B 312 (as received from the route reflector for the New York area 322) to a route via provider edge A 306 in Los Angeles 320. As discussed above, making the alteration to the local preferred route at the route reflector would likely change the routing tables for all provider edges that are clients of the route reflector, such as provider edge B 312 and provider edge C 314. Through the traffic controller 330, however, the local preferred route may be altered for provider edge D 316 only providing a more targeted alteration to the routing of communications of the network 102. In another example, a network administrator of network 302 may load balance communications in the New York area 322 by redirecting communications from provider edge D 316 to provider edge A 306. The load balancing may occur based on one or more measured performance metrics of the network 302, such as congestion at preferred egress point provider edge B 312.

To alter the local preferred route at PE-D 338, the traffic controller 330 may be configured, in some instances, to leak or otherwise provide the local preferred route indicator via provider edge A 306 from VRF A 332 to VRF D 338 associated with provider edge D 316. The leaked route may include a parameter associated with a route that indicates the local preference for that route. For example, the route to border network B 318 provided to VRF D 338 from VRF-A 332 may include a local preferred route parameter that is higher than other routes to the border network B 318. Provider edge D 316 may, when intending to route a received communication to border network B 318, select the stored route to border network B with the highest local preferred route parameter. In this manner, the leaked route may become the preferred local route to border network B for communications received at provider edge D 316 of the network 302. In general, any parameter of the route in the routing table for a device may be utilized to indicate a preference for a particular route. In some implementations, a network administrator may access one or more of the VRF 332-338 maintained by the traffic controller 330 to configure the respective VRF tables with a preferred or alternate route. Through the preferred route parameter, one or more routes in a VRF associated with a component or device of the network 302 may be altered by the traffic controller 330.

The routes of the VRF tables (such as VRF-D 338) may be provided to the corresponding network devices (such as provider edge D 316) for storage as a routing table for that device. For example, the provider edges 306, 312-316 associated with the traffic controller 330 may be clients of the traffic controller such that routing information or tables maintained by the traffic controller may be provided to the client devices. Provider edge D 316 may thus receive the routing information included in VRF-D 338, provider edge C 336 may receive routing information included in VRF-C 336, etc. Further, the routing information received from the traffic controller 330 may supersede or override the routing information received from a route reflector device. For example, provider edge D 316 may receive routing information from a route reflector device, as explained above with relation to FIG. 2. This routing information may designate a local preferred route to border network B 318 via provider edge B 312 such that communications received at provider edge D 316 intended for border network B 318 may thus be routed via provided edge B 312 based on the routing information received from the route reflector. To override the route information provided by the route reflector, the VRF 338 at the traffic controller 330 associated with provider edge D 316 may be altered with a different local preferred route via provider edge A 306. The altered route may be transmitted to provider edge D 316 and installed in the routing table for the provider edge. The provider edge 316 may then transmit communications for the border network via provider edge A 306 as the local preferred route.

Further, the routing information for provider edge B 312 and provider edge C 314 may not be altered by the change to the routing information for provider edge D 316. For example, the routing information stored at provider edge B 312 and provider edge C may include the local preferred route via provider edge B 312 received during the BGP session with the route reflector or other network device. The change of the local preferred route via the provider edge A 306 may only be altered for provider edge D 316. Thus, the traffic controller 330 may provide for alterations in routing information for individual devices associated with the network 302 while retaining the original routing information for other devices in the same metro or locality.

Figure 4:
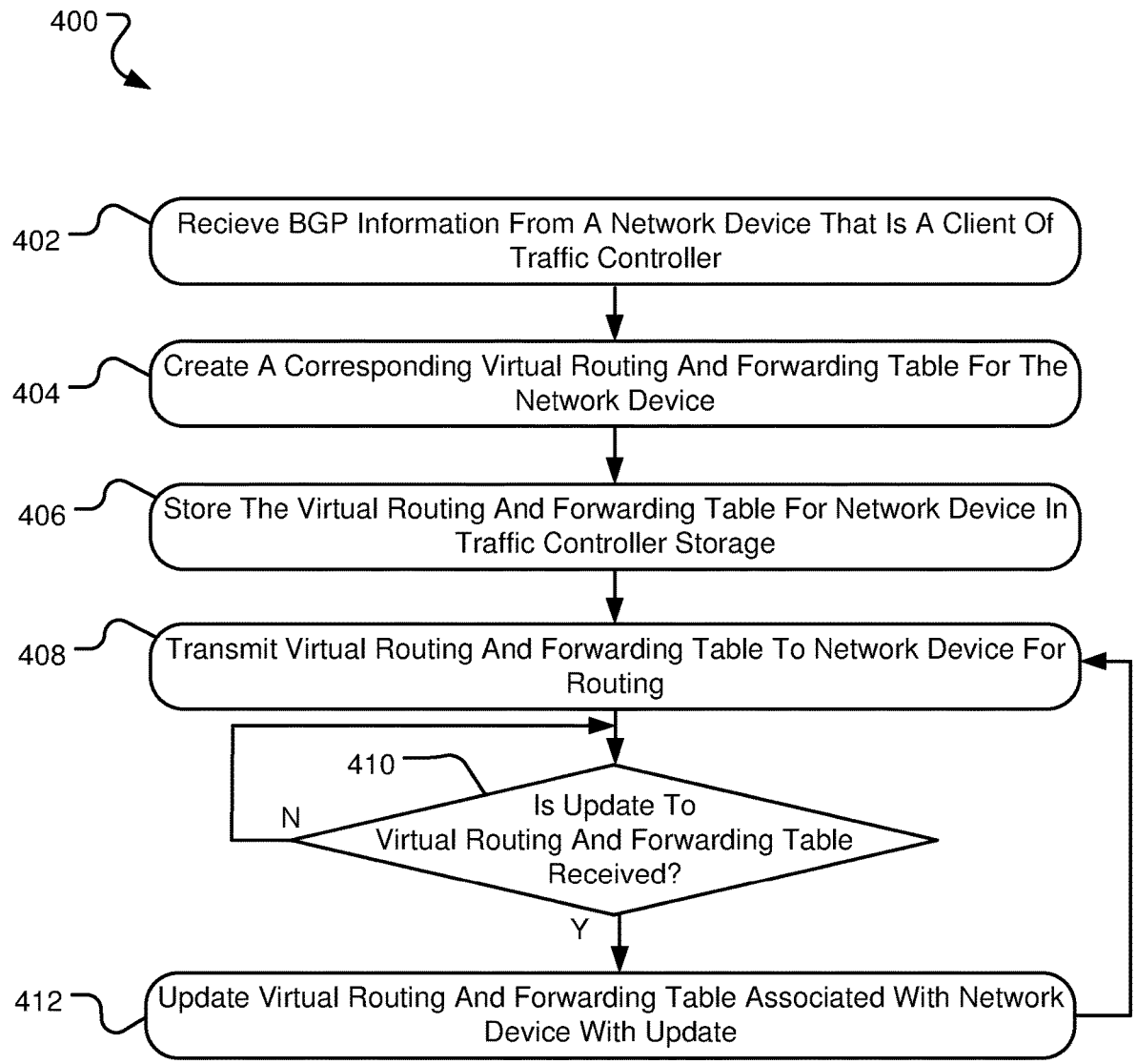
FIG. 4 is a flowchart illustrating a method for a component of a telecommunications network to distribute a route to a routing device of the network.

FIG. 4 is a flowchart illustrating a method 400 for a component of a telecommunications network to distribute a virtual routing table to a routing device of the network. The operations of the method 400 of FIG. 4 may be performed or executed by the traffic controller 330 of the network environment 300 of FIG. 3 discussed above. The operations may be performed by one or more hardware components, the execution of one or more software instructions, or a combination of both hardware components and software components. In general, any component of combination of components of the telecommunications network 302, including and separate from the traffic controller 330, may perform one or more of the operations of the method 400 of FIG. 4.

Beginning in operation 402, the traffic controller 330 may receive BGP or other routing information from one or more devices of the network. In one implementation, the traffic controller 330 receives BGP routing information from a provider edge device of the network 302. Other devices, such as other provider edges, of the network 302 may also provide BGP information to the traffic controller 330. In operation 404, the traffic controller 330 may create one or more virtual routing and forwarding tables for storing routing information and, in operation 406, may store the created VRF in storage of the traffic controller device. Each of the VRF tables may correspond to a network device from which the routing information was received such that the traffic controller 330 may store any number of VRF tables for corresponding network devices. In some instances, the VRF table of the traffic controller 330 may include an indication of the network device to which the table corresponds such that an administrator accessing the traffic controller 330 may determine which VRF corresponds to which network device. In another example, each VRF stored by the traffic controller 330 may include an indicator of the corresponding network device in such a manner as to be searchable by the traffic controller 330 for access and updating with additional routing information.

In operation 408, the VRF information or table may be transmitted to the corresponding network device for use by the networking device in routing received communications. The routing information may be transmitted through a BGP session (such as an internal BGP session) between the traffic controller 330 and the corresponding network device. For example, the network device may be a BGP client device of the traffic controller 330 such that updates to the VRF table may be transmitted to the network device through the BGP session between the network device and the traffic controller. In this manner, the traffic controller 330 may create, update, or determine routing information for a particular network device and provide the routing information to the network device. The network device may store the updated routing information in a routing table for use when communications are received at the network device.

Further, through the traffic controller 330, updates to a routing table of a particular network device may occur without updating other neighboring network devices in the same metro or locality. In particular, the traffic controller 330 may determine if an update to the stored VRF table for the networking device is received at operation 410. In one example, the update to the VRF table may include a preferred route or other routing information that is different from the stored VRF routing information, such as a preferred route parameter value. The preferred route parameter may indicate which route of multiple routes in the routing table is the preferred route to reach a particular destination. In an update to the VRF is not received, the traffic controller 330 may continue to monitor for such an update by returning to operation 310. When an update to the VRF is received, the routing information in the VRF may be updated into the VRF by the traffic controller 330 in operation 412. In one instance, the updated routing information may be provided from another VRF maintained by the controller 330 for a separate network device. In another implementation, the routing information updated into the VRF may be based on a network policy decision determined by the traffic controller or a network administrator and executed via the traffic controller. Upon updating, the revised VRF table may be transmitted to the network device in operation 408 for use in routing received communications. In this manner, the traffic controller 330 may provide for alterations in routing information for individual devices associated with the network 302 while retaining the original routing information for other devices in the same metro or locality.

Figure 5:
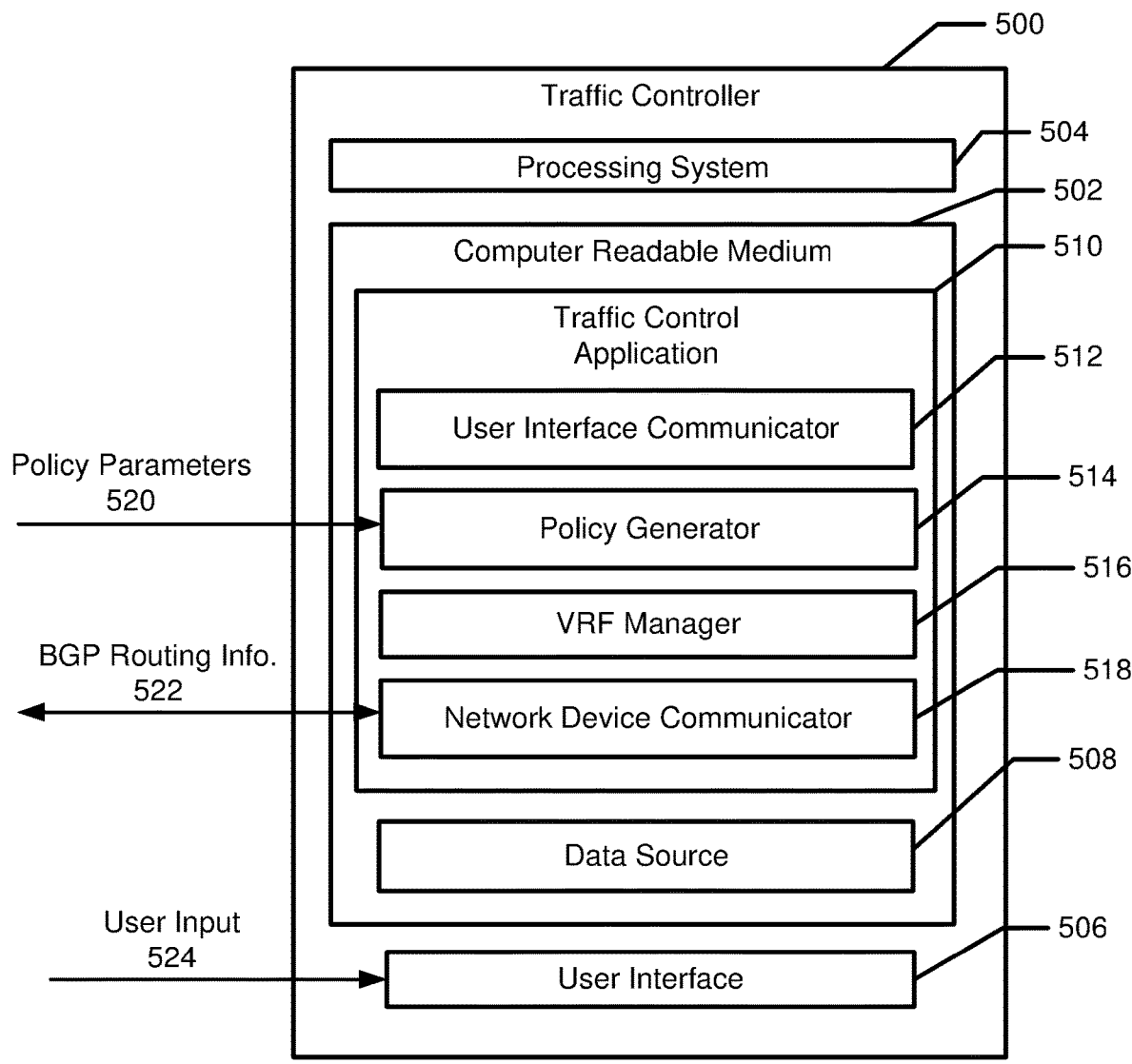
FIG. 5 is a schematic diagram illustrating a security management system for managing security protocols and devices of a communications network in accordance with one embodiment.

FIG. 5 is a schematic diagram illustrating an implementation of the traffic controller 500 for controlling routing tables of devices of a communications network. In some instances, a traffic control application 510 may be executed on the traffic controller 500 to perform one or more of the operations described herein. The traffic control application 504 may be stored in a computer readable media 502 (e.g., memory) and executed on a processing system 504 of the traffic controller 500 or other type of computing system, such as that described below. For example, the traffic control application 510 may include instructions that may be executed in an operating system environment, such as a Microsoft Windows™ operating system, a Linux operating system, or a UNIX operating system environment. The computer readable medium 502 includes volatile media, nonvolatile media, removable media, non-removable media, and/or another available medium. By way of example and not limitation, non-transitory computer readable medium 502 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the traffic controller 500 also provides a user interface (e.g., a command line interface (CLI), a graphical user interface (GUI), etc.) 506 displayed on a display, such as a computer monitor, for displaying data. Through the user interface 506, a user of the traffic controller 500 may provide customer inputs 524 through one or more input devices. The customer input 524 may be used by the traffic controller 500 to, among other things, apply a routing policy to one or more virtual routing and forwarding (VRF) tables, receive an update to the routing policy for one or more network devices, and the like. The input device for providing the customer input 524 may include, among others, a keyboard or a pointing device (e.g., a mouse, trackball, pen, or touch screen) to enter data into or interact with the user interface 506.

In one example, the user interface 506 may communicate with other components in the traffic control application 510 to receive user input for manipulating or otherwise modifying the operation of the traffic control application 510. For example, user interface communicator 512 may communicate with user interface 506 to receive customer input 524 for use by the other components of the traffic control application 510. The user interface communicator 512 may also provide information to for display via the user interface 506, such as VRF tables and networking devices associated with the traffic controller 500. As another example, the user interface 506 may receive user input for modifying and/or reviewing a stored VRF table on a display associated with the traffic controller 500 and provide the modification to the user interface communicator 512 for processing.

The traffic control application 510 may also utilize a data source 508 of the computer readable media 502 for storage of data and information associated with the traffic controller 500. For example, the traffic control application 510 may store information associated with the client devices of the traffic controller 500, one or more routing policies for application by the traffic controller 500, virtual routing and forwarding tables for the client devices, and the like. In general, any data or information utilized by the security management application 310 may be stored and/or retrieved via the data source 308.

The traffic control application 510 may include several components to perform one or more of the operations described herein. For example, a policy generator 514 may be included in the traffic control application 510 to receive, process, and/or apply a routing policy to the one or more VRF tables stored by the traffic controller 500. In one instance, the policy generator may include a preference of a peer network, such as Border Network B 318 to egress communications via provider edge A 306 of the network 302. Other peer network or border network preferences may be stored and maintained by the policy generator 514 of the traffic controller 500. Also, the traffic controller 500 may be programmed or controlled by a user of the controller, such as an administrator of the IP network 302, to receive one or more policy parameters 520 and apply a routing policy to one or more of the VRF tables, such as a network-preferred egress point for a particular border network, based on the received parameters 520. In some instances, the policy generator 514 may include logic or other operations to determine a routing policy based on the policy parameters 520 received. The policy parameters 520 may be provided by a user of the traffic controller 500, including an operator of the peer or border network to which the routing policy may apply. The policy parameters 520 may be received, in some instances, via the user interface 506 described above.

A VRF manager 516 may also be included in the traffic control application 510 to transmit configuration instructions to one or more stored VRF tables, add or delete routing information from the VRF tables, instruct a VRF table to leak a route or preference to another VRF table, and generally control the information stored in or associated with each of the VRF tables of the traffic controller 500. In one particular example, the policy generator 514 may utilize the VRF manager 516 to communicate with the one or more VRF tables to apply the policy parameters 520 received via the user interface 506.

A network device communicator 518 may also be included in the traffic control application 510 to receive and provide BGP routing information with one or more devices of the network. In particular, the network device communicator 518 may receive BGP information 522 from the network devices during a BGP session with the devices. This routing information 522 may provide an initial VRF table associated with the respective network device. Further, upon an update to the VRF table associated with the network device, network device communicator 518 may initiate an additional BGP session with the associated network device to provide the updated VRF table information for storage at the network device. In this manner, the network device communicator 518 provides a mechanism through which routing information 522 may be received and provided to network devices.

It should be appreciated that the components described herein are provided only as examples, and that the application 510 may have different components, additional components, or fewer components than those described herein. For example, one or more components as described in FIG. 5 may be combined into a single component. As another example, certain components described herein may be encoded on, and executed on other computing systems, such as on one remotely coupled to traffic controller 500.

Figure 6:
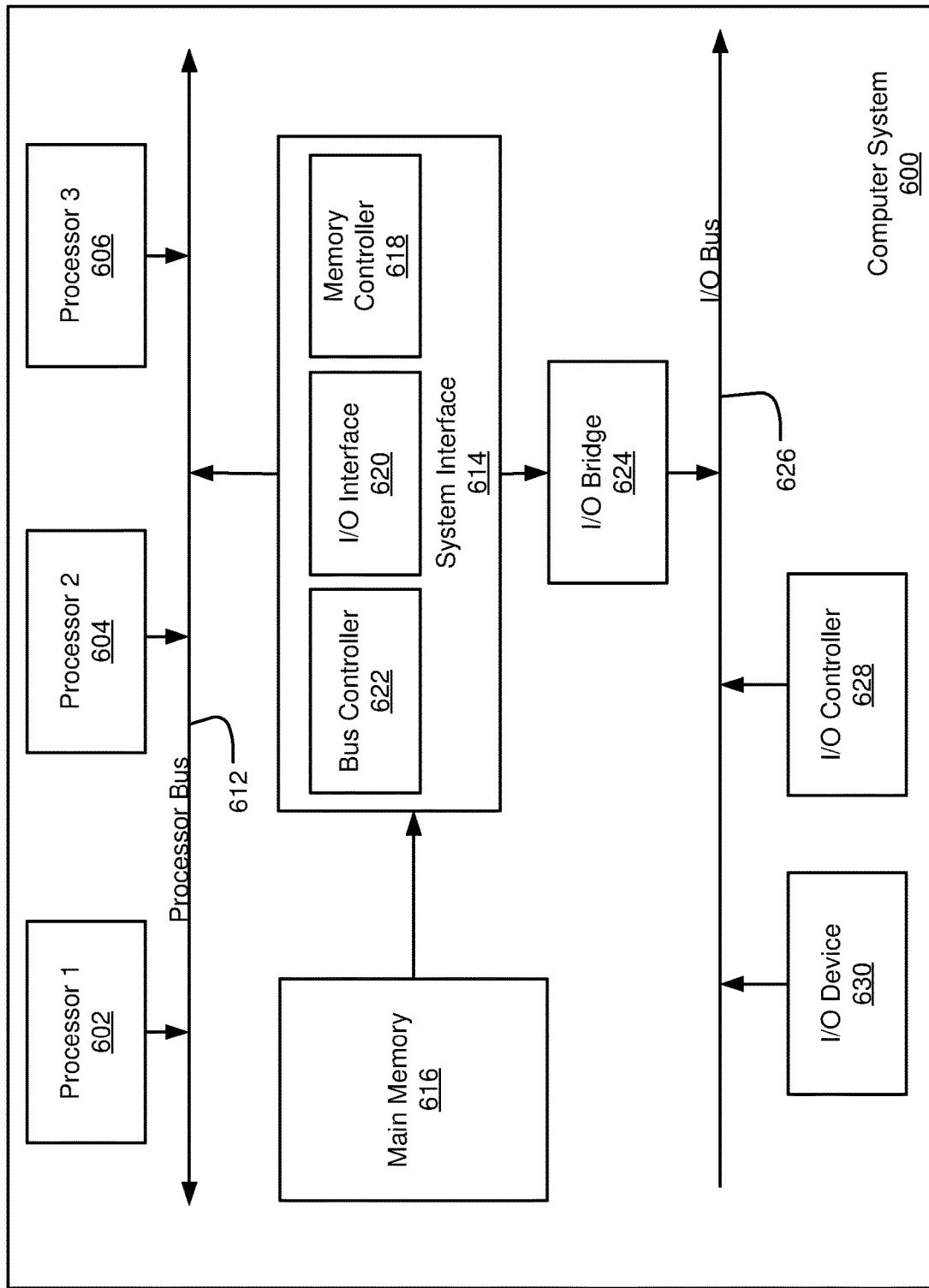
FIG. 6 is a diagram illustrating an example of a computing system which may be used in implementing embodiments of the present disclosure.

FIG. 6 is a block diagram illustrating an example of a computing device or computer system 600 which may be used in implementing the embodiments of the components of the network disclosed above. For example, the computing system 600 of FIG. 6 may be the traffic controller device 330 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for operating a telecommunications network, the method comprising:
   receiving, at a first network device, a plurality of routing information from a plurality of edge devices of a telecommunications network, each of the plurality of routing information comprising a local preferred route for a corresponding edge device;
   generating a plurality of virtual routing tables, each of the plurality of virtual routing tables associated with a corresponding edge device of the plurality of edge devices and comprising the local preferred route for the corresponding edge device;
   updating, by the first network device, a first routing table of the plurality of virtual routing tables with an updated local preferred route different than an initial local preferred route of the first routing table; and
   transmitting, via a border gateway protocol session and to the corresponding edge device associated with the first routing table, the updated local first routing table,
   wherein the updated local preferred route is received via a user interface associated with the first network device, and
   updating the first routing table with the updated local preferred route comprises transmitting a local preferred route of a second routing table of the plurality of routing tables to the first routing table.

2. The method of claim 1 wherein the local preferred route of the second routing table comprises a first local preferred routing parameter value larger than a local preferred routing parameter value of the initial local preferred route.

3. The method of claim 1 wherein a subset of the plurality of edge devices are associated with a metro of the telecommunications network, the subset of the plurality of edge devices receiving the initial local preferred route from a route reflector device.

4. The method of claim 3 wherein the subset of the plurality of edge devices comprises the corresponding edge device and transmitting the updated local first routing table configures the corresponding edge device associated with the first routing table with a local preferred route different than a local preferred route of the remaining edge devices of the subset of the plurality of edge devices of the metro.

5. The method of claim 1 further comprising:
   receiving, via a user interface and at the first network device, a routing policy parameter, wherein updating the first routing table is based on the routing policy parameter.

6. An apparatus comprising:
   a processing device;
   a communication port receiving a plurality of routing information from a plurality of edge devices of a telecommunications network, each of the plurality of routing information comprising a local preferred route for a corresponding edge device; and
   a non-transitory computer-readable medium encoded with instructions, when executed by the processing device, cause the processing device to perform the operations of:
      generating a plurality of virtual routing tables, each of the plurality of virtual routing tables associated with a corresponding edge device of the plurality of edge devices and comprising the local preferred route for the corresponding edge device;
      updating a first routing table of the plurality of virtual routing tables with an updated local preferred route different than an initial local preferred route of the first routing table;
      transmitting, via a border gateway protocol session and to the corresponding edge device associated with the first routing table, the updated local first routing table;
      receiving the updated local preferred route via a user interface in communication with the processing device; and
      transferring a local preferred route of a second routing table of the plurality of routing tables to the first routing table.

7. The apparatus of claim 6, further comprising:
   a storage device in communication with the processing device, the instructions further causing the processing device to perform the operation of:
   storing the plurality of virtual routing tables in the storage device.

8. The apparatus of claim 6 wherein the local preferred route of the second routing table comprises a first local preferred routing parameter value larger than a local preferred routing parameter value of the initial local preferred route.

9. The apparatus of claim 8 wherein a subset of the plurality of edge devices are associated with a metro of the telecommunications network, the subset of the plurality of edge devices receiving the initial local preferred route from a route reflector device.

10. The apparatus of claim 9 wherein the subset of the plurality of edge devices comprises the corresponding edge device and transmitting the updated local first routing table configures the corresponding edge device associated with the first routing table with a local preferred route different than a local preferred route of the remaining edge devices of the subset of the plurality of edge devices of the metro.

11. The apparatus of claim 10 wherein a second edge device of the plurality of edge devices is associated with a second metro of the telecommunications network, the second routing table of the plurality of routing tables associated with the second edge device.

12. A telecommunications network comprises:
a plurality of network devices; and
a traffic controller comprising:
  a processing device;
  a communication port receiving a plurality of routing information from the plurality of network devices, each of the plurality of routing information comprising a local preferred route for a corresponding network device; and
  a non-transitory computer-readable medium encoded with instructions, when executed by the processing device, cause the processing device to perform the operations of:
    generating a plurality of virtual routing tables, each of the plurality of virtual routing tables associated with a corresponding network device of the plurality of network devices and comprising the local preferred route for the corresponding network device;
    updating a first routing table of the plurality of virtual routing tables with an updated local preferred route different than an initial local preferred route of the first routing table;
    transmitting, via a border gateway protocol session and to the corresponding network device associated with the first routing table, the updated local first routing table;
    receiving the updated local preferred route via a user interface in communication with the processing device; and
    transferring a local preferred route of a second routing table of the plurality of routing tables to the first routing table.

13. The telecommunications network of claim 12 wherein the local preferred route of the second routing table comprises a first local preferred routing parameter value larger than a local preferred routing parameter value of the initial local preferred route.

14. The telecommunications network of claim 12 further comprising:
  a route reflector device providing the initial local preferred route to a subset of the plurality of network devices associated with a metro of the telecommunications network.

* * * * *